April 16, 1940.                O. F. GOTTLIEB                2,197,039
                    METHOD OF BRAZING AND CASEHARDENING
                           Filed March 24, 1939
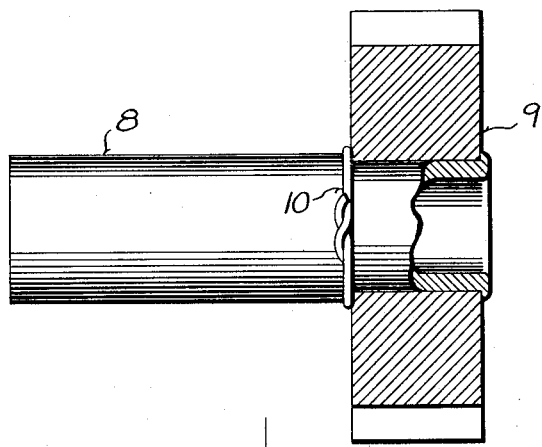
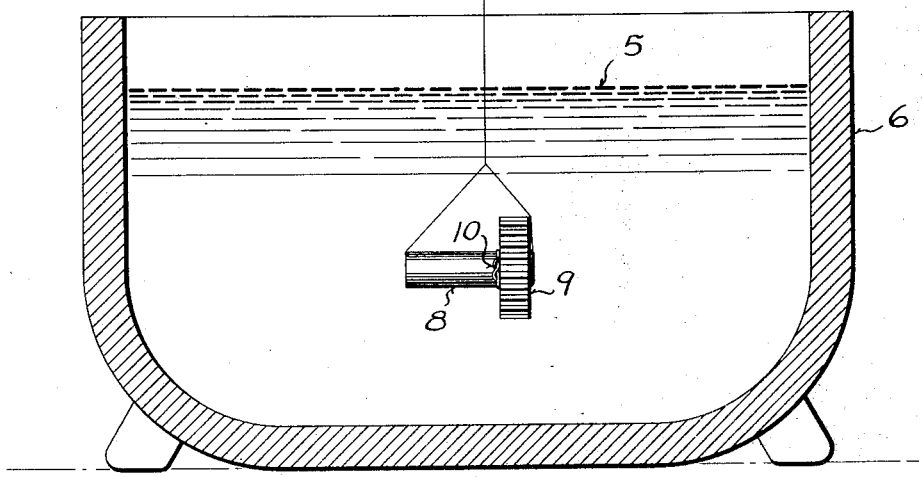
Inventor
Oscar F. Gottlieb
By
   Attorney Patented Apr. 16, 1940

2,197,039

UNITED STATES PATENT OFFICE 2,197,039

METHOD OF BRAZING AND CASE-HARDENING

Oscar F. Gottlieb, Milwaukee, Wis., assignor to Briggs & Stratton Corporation, Milwaukee, Wis., a corporation of Delaware Application March 24, 1939, Serial No. 263,854

1 Claim. (Cl. 148—4)

This invention relates to the art of heat treating and brazing, and refers particularly to casehardening and brazing steel objects.

There are several methods of casehardening steel, but for small parts, the cyanide process is probably the most generally used.

A simple method of practicing cyanide casehardening is to dip the part to be treated into a bath of molten potassium cyanide to carburize it, leaving it immersed for a period of time depending upon the depth of the case desired. Upon withdrawing the article from the cyanide bath, it is either quenched directly by dipping it in water or oil, or it is allowed to cool and subsequently reheated and treated in any approved manner.

Brazing, as is well known to those skilled in the art, consists merely in assembling the parts to be joined, applying an adequate amount of spelter solder, which may be copper or a copper-zinc alloy, adjacent to the juncture of the parts, and heating the assembled unit to a temperature sufficiently high to cause the spelter solder to fuse with the parts being brazed. Preferably, the heating is effected in an atmosphere free from oxygen. This has led to widespread use of the hydrogen furnace.

The relatively high temperatures required for brazing draw much of the carbon content out of the steel leaving it with a soft "spongy" structure so that subsequent carburizing is necessary to fit it for its intended purpose.

While the added cost and inconvenience occasioned by this objectionable result entailed by past methods must have been appreciated by the art, nothing was ever proposed as a remedy; and apparently, decarburization was accepted as inevitable.

This invention, however, makes possible the brazing of steel objects without incurring the objectionable decarburization so that the steel is left unchanged by the brazing, at least, no diminution of carbon content takes place.

On the contrary, this invention has as one of its objects to provide a method of brazing by which carbon is added to the steel to any controllable extent.

Heretofore, when an article required both brazing and casehardening, the production costs were stepped up materially by the necessarily increased amount of handling, for with all known past methods of brazing and casehardening, the brazing operation had to be completely finished before casehardening could be undertaken.

The present invention materially reduces the production costs of such articles by providing a practical method of simultaneously brazing and casehardening for it has been found that these two operations can be conducted simultaneously, and that the method employed therefor not only is successful, but produces a better and stronger brazed joint at a lower cost.

This objective is achieved through the use of a copper alloy spelter solder having a tensile strength much higher than that of copper (which heretofore was used almost exclusively for brazing steel parts), and a melting point lower than the ideal temperature for cyanide casehardening.

The purpose of this invention thus is to make possible the brazing of steel without decarburizing it, simultaneously brazing and carburizing for casehardening, and the production of a brazed joint of maximum strength at a production cost well below the lowest costs attainable with past methods of brazing and casehardening.

With the above and other objects in view which will appear as the description proceeds, this invention resides in the novel construction, combination and arrangement of parts substantially as hereinafter described, and more particularly defined by the appended claim, it being understood that such changes in the precise embodiment of the hereindisclosed invention may be made as come within the scope of the claim.

The accompanying drawing illustrates one complete example of the physical embodiment of the invention constructed in accordance with the best mode so far devised for the practical application of the principles thereof, and in which:

Figure 1 is a side view, partially in section, of a simple gear and hub assembled preparatory to being brazed together; and Figure 2 illustrates the manner in which the assembled unit is dipped into the cyanide bath for simultaneously brazing the parts and carburizing them for casehardening.

In practicing the process of this invention, a carburizing bath of potassium cyanide which may contain ingredients to augment its carburizing effect, or any other suitable carburizing compound, is employed. In the drawing, this bath is indicated by the numeral 5, and, as is customary, it is contained within a suitable crucible 6, and kept in a molten state by the application of heat in any suitable manner. If potassium cyanide is used, the temperature of the bath as now commercially used must not exceed 1700° F., 1650° F. being preferable.

The parts to be treated, after being properly assembled, are immersed in this bath, as shown in Figure 2, by means of a steel wire 7, or any other suitable support.

The assembly illustrated in the drawing consists of a hub 8 having a gear 9 mounted thereon at one end. The hub and the gear are made of steel and are to be brazed together. To this end, the hub has its portion which receives the gear slightly reduced in diameter to form a shoulder against which the inner face of the gear abuts, and the extremity of the hub is peened over to hold the gear in place. A band 10 of spelter wire is then applied, as shown in Figure 1, in close juxtaposition to the juncture between the hub and gear so that when the spelter fuses, it flows by capillary attraction into the joint between the two parts.

Properly assembled in this manner, the unit is immersed in the cyanide bath and allowed to remain for a period of time depending upon the depth of the case desired. An immersion of thirty minutes in ordinary cyanide produces a case thickness of between .005 to .01 of an inch.

Inasmuch as it is desirable to have the spelter fused by the heat of the cyanide bath, it is necessary that an alloy be employed which has a fusion point below 1700° F., and preferably 1650° F., the desirable temperature for cyanide hardening.

An alloy composed of sixty (60) parts copper and forty (40) parts zinc has been found exceptionally well suited for this purpose as its fusion point, 1634° F., is below the ideal temperature for the cyanide bath, and its tensile strength is higher than that of any of the copper alloys. Any other spelter which melts at a temperature below that used for the cyanide bath could be employed, it being understood that the temperature used for the bath may vary according to the product used.

The treatment is completed by quenching the article in oil or water directly upon being withdrawn from the cyanide bath, or it may be allowed to cool and thereafter heat treated in any approved manner.

From the foregoing, it is obvious that the method hereindisclosed has many advantages over the past and existing practice of brazing and casehardening in two separate operations, especially in that no diminution of carbon content is entailed, but rather, carburization to any controllable extent is achieved concomitantly with the brazing, for by merely controlling the duration of the immersion, any desired amount of carbon can be introduced into the steel.

What I claim as my invention is:

The hereindescribed method of brazing and casehardening an article composed of two or more connected metal parts, at least one of which is formed of steel, in a single operation which comprises: assembling the article with a quantity of an alloy composed of approximately 60 parts of copper and 40 parts of zinc applied adjacent to the juncture between its parts, immersing the article in a molten carburizing bath maintained at a temperature of approximately 1650° Fahrenheit; leaving the article immersed for a period of time depending upon the thickness of the casehardening desired; and quenching the article directly upon its withdrawal from the carburizing bath.

OSCAR F. GOTTLIEB.